United States Patent
Keech (10) Patent No.: US 8,740,544 B2
(45) Date of Patent: Jun. 3, 2014

(54) WIND TURBINE ASSEMBLY WITH FLOW REGULATOR

(75) Inventor: Winston Donald Keech, Whitby (GB)

(73) Assignee: The Power Collective Ltd, Knaresborough (GB)

( * ) Notice: Subject to any disclaimer, the term of this patent is extended or adjusted under 35 U.S.C. 154(b) by 142 days.

(21) Appl. No.: 13/386,367

(22) PCT Filed: Jul. 22, 2010

(86) PCT No.: PCT/GB2010/051214
§ 371 (c)(1),
(2), (4) Date: Mar. 29, 2012

(87) PCT Pub. No.: WO2011/010159
PCT Pub. Date: Jan. 27, 2011

(65) Prior Publication Data
US 2012/0175879 A1 Jul. 12, 2012

(30) Foreign Application Priority Data
Jul. 22, 2009 (GB) .................................. 0912695.4

(51) Int. Cl.
*F03D 9/00* (2006.01)
(52) U.S. Cl.
USPC .......................................................... 415/4.1
(58) Field of Classification Search
USPC ............................................. 290/55; 415/4.1
See application file for complete search history.

(56) References Cited

U.S. PATENT DOCUMENTS

| 1,697,574 | A | | 1/1929 | Savonius | |
|---|---|---|---|---|---|
| 1,835,018 | A | | 12/1931 | Darrieus | |
| 4,315,713 | A | * | 2/1982 | Verplanke | 415/125 |
| 4,474,529 | A | * | 10/1984 | Kinsey | 415/4.2 |
| 6,857,846 | B2 | * | 2/2005 | Miller | 415/4.2 |
| 7,540,705 | B2 | * | 6/2009 | Emshey | 415/4.1 |
| 2007/0018464 | A1 | * | 1/2007 | Becker | 290/55 |
| 2009/0015019 | A1 | * | 1/2009 | Donaghey | 290/55 |
| 2009/0267351 | A1 | * | 10/2009 | Buns | 290/55 |
| 2009/0304512 | A1 | | 12/2009 | Attey | |
| 2010/0135768 | A1 | * | 6/2010 | Pitre | 415/7 |
| 2011/0187114 | A1 | * | 8/2011 | Socolove | 290/55 |
| 2011/0215586 | A1 | * | 9/2011 | Grace | 290/55 |
| 2012/0007362 | A1 | * | 1/2012 | Bannister | 290/44 |

FOREIGN PATENT DOCUMENTS

| DE | 102007032843 A1 | * | 1/2009 |
|---|---|---|---|
| DE | 202008014689 | | 2/2009 |
| GB | 2453357 A | | 8/2009 |

(Continued)

OTHER PUBLICATIONS

Written Opinion of the International Searching Authority for International Application No. PCT/GB2010/051214, Jan. 24, 2012.

(Continued)

*Primary Examiner* — Joseph Waks
(74) *Attorney, Agent, or Firm* — Garvey, Smith, Nehrbass & North, L.L.C.; Seth M. Nehrbass; Julia M. FitzPatrick (57) ABSTRACT

A wind turbine assembly including an elongate generally cylindrical rotor operable to rotate about an axis, an elongate rotor housing that houses the rotor and which is adapted to be secured to a roof, and a flow regulator adapted to regulate wind flow to the rotor, wherein the flow regulator is orientatable in an open orientation, a closed orientation and a partially open orientation.

20 Claims, 8 Drawing Sheets

(56) References Cited

FOREIGN PATENT DOCUMENTS

| JP | 2004239247 A | | 8/2004 |
| JP | 2005207288 A | * | 8/2005 |
| JP | 2006266236 | | 10/2006 |
| WO | WO 2006123951 | | 11/2006 |
| WO | 2009009701 A2 | | 1/2009 |

OTHER PUBLICATIONS

Combined Search and Examination Report under Section 17 and 18(3) for Application No. GB1012313, Sep. 7, 2010.

* cited by examiner

WIND TURBINE ASSEMBLY WITH FLOW REGULATOR

FIELD OF INVENTION

The present invention relates to a generator, specifically to a generator for generating electricity from wind power.

BACKGROUND TO THE INVENTION

The generation of electricity from wind power is well known in the art. However, although wind power is known to be one of the most valuable sources of renewable energy, it has been characterised by moderate to very large wind turbines, typically grouped together in "wind farms". Well known are large scale Horizontal Axis Wind Turbines, or HAWTs, which are the familiar tower mounted propellers, with a rear mounted alternator, and which can be as high as several hundred feet tall and hundreds of feet in diameter. Other less common designs of large-scale wind turbine comprise Savonius rotors or Darrieus rotors, as described in U.S. Pat. No. 1,697,574 and U.S. Pat. No. 1,835,018 respectively.

HAWTs disadvantageously lead to visual intrusion, safety concerns, destruction of bird and bat life as well as serious disruption to airborne and ground based radar systems, due to both the large rotating surfaces and atmospheric disturbances behind the turbines. Further considerations are the impact of noise emanating from the wingtips, which rotate at high speeds, and the large amounts of energy used to produce the high grade materials used in their construction. Also, such HAWTs are exposed to the elements in all conditions, and accordingly are vulnerable to damage during extreme weather conditions. Yet further, such HAWTs are typically grouped into "wind farms" in rural locations, remote from energy consumers leading to associated cost and inefficiencies in the distribution of the generated electricity.

Accordingly, interest has grown in the provision of wind-turbines that may be located on buildings and having cross-flow, horizontal axis, elongate rotors of generally cylindrical shape, typically of the paddle wheel, Savonius or Darrieus types.

Although it is known to mount the rotor directly to the ridge (apex) of a roof, as disclosed in US20090304512 and DE202008014689, it is preferable to locate the rotor within a housing for aesthetic and structural reasons.

JP200365206 discloses a wind turbine comprising a housing mounted onto the ridge of a roof and having a plurality of rotors mounted parallel with the roof ridge. Disadvantageously, the housing of JP200365206 provides only a limited protection to the rotors in the case of high wind, such that the wind turbine is vulnerable to damage in high winds. Also in high winds the rotation of the rotor may be too high for the operational capacity of the power generation system.

WO2009009701 discloses a wind turbine having a cylindrical housing that is mounted onto the apex of a roof. The housing has pivotable air flow guides that may be dynamically angled. To provide protection to the rotor, the air flow guides may be closed in high wind conditions. Disadvantageously, the air flow guides are directly exposed to high winds and are susceptible to damage.

JP2003129941 discloses a wind turbine within a funnel shaped housing for mounting on the ridge of a roof. The rotor is provided with a wind flow control element, that comprises a cylindrical member surrounding the rotor and having an inlet and outlet slit, which may be orientated in one of two configurations, subject to the prevailing wind direction. Damage to the rotor in high winds is prevented by lowering air deflector flaps to close the housing. Disadvantageously, such a wind turbine is complex and expensive. Further, the closable flaps remain directly exposed to high winds, and so are susceptible to damage.

JP2006266236 discloses a wind turbine having a funnel-shaped housing mounted on the ridge of a roof, and within which cross-flow, horizontal axis, elongate rotor of generally cylindrical shape is mounted for rotation about an axis parallel with the roof ridge. A wind attenuator is provided within the housing, comprising a cylindrical screen having two quarters having wide openings, and the two remaining quarters having screens with slit-like openings. The wind attenuator is ordinarily held in an unattenuated orientation, in which the wide openings align with the inlet and outlet of the housing. The wind attenuator is biased to rotate about the axis of the rotor into an attenuated orientation. When the wind speed exceeds a predetermined speed, a wind sensing plate is blown over, disengaging a locking mechanism, such that the wind attenuator rotates into the attenuated orientation. In the attenuated orientation, wind passes through the slit-like openings, but at a rate that is reduced relative to that which passes through the wide openings in the unattenuated orientation. Disadvantageously, the device of JP2006266236 is only capable of operating with the wind attenuator in an unattenuated orientation or an attenuated orientation. Consequently, wind exposure of the rotor cannot be optimised to maximise energy generation. Further, the rotor cannot be completely shielded from the wind in high wind conditions or during maintenance. Such a mechanically operated mechanism is vulnerable to manufacturing tolerances, as well as mechanical wear over the operational lifetime. The method of resetting the wind attenuator into the unattenuated position is not disclosed.

The present invention seeks to address at least some of the problems mentioned above.

SUMMARY OF THE INVENTION

According to a first aspect of the present invention, there is provided
a wind turbine assembly comprising,
an elongate generally cylindrical rotor operable to rotate about an axis,
an elongate rotor housing that houses the rotor and which is adapted to be secured to a roof, and
a flow regulator adapted to regulate wind flow to the rotor, wherein the flow regulator is orientatable in an open orientation, a closed orientation and a partially open orientation.

According to a second aspect of the present invention, there is provided a building comprising
a wind turbine assembly comprising,
an elongate generally cylindrical rotor operable to rotate about an axis,
an elongate rotor housing that houses the rotor and which is adapted to be secured to a roof, and
a flow regulator adapted to regulate wind flow to the rotor,
wherein the flow regulator is orientatable in an open orientation, a closed orientation and a partially open orientation,
wherein the wind turbine assembly is secured to a roof of the building.

According to a third aspect of the present invention, there is provided a wind turbine control system adapted to control the orientation of a flow regulator of a wind turbine assembly comprising,
- an elongate generally cylindrical rotor operable to rotate about an axis,
- an elongate rotor housing that houses the rotor and which is adapted to be secured to a roof, and
- a flow regulator adapted to regulate wind flow to the rotor, wherein the flow regulator is orientatable in an open orientation, a closed orientation and a partially open orientation.

According to a fourth aspect of the present invention, there is provided a vibration reduction bracket suitable for mounting an elongate generally cylindrical wind turbine rotor at the ridge of a pitched roof, comprising
- a first bracket section adapted for insertion between portions of roof covering and attachment to a roof spar,
- a second bracket section adapted for connection to a support for a wind turbine rotor,
- a connection mechanism connecting the first and second bracket sections, and
- an isolation element between the first and second bracket sections to reduce the transfer of vibrations between the bracket sections.

Advantageously, by provision of the housing, the wind turbine assembly may be less visually intrusive than large free standing wind turbines. Advantageously such a design may also present less of a hazard to birds and bats than large free standing wind turbines, and produce less noise. Advantageously, the wind turbine assembly may be located on the roof or on a nearby roof for the consumer, providing efficient local supply of electrical power to the consumer.

Advantageously, by orientation of the flow regulator to not just a fully open and a fully closed orientation, but also to at least one intermediary orientation, further options for controlling the rotor speed are provided. The orientation may be continuously varied, or may be step-wise varied. Advantageously, in the case that the flow regulator may be orientated to any orientation between fully open and fully closed (i.e. continuously adjustable orientation), the energy generation performance of the wind turbine assembly may be optimised for any given wind condition, for example avoiding overloading and associated risks of electrical and heat damage.

Advantageously, the wind turbine does not require the provision of closeable flaps, rather the rotor may be protected by suitable orientation of the flow regulator. Further, advantageously the housing of the wind turbine assembly provides protection to the rotor and flow regulator. Accordingly the wind turbine may be mechanically simple and inexpensive to manufacture, have a high reliability and long operational lifetime.

Advantageously, by use of an electrical wind turbine control system, the threshold weather conditions for triggering partial or complete closure of the flow regulator may be accurately set. Advantageously, by provision of an electrical control system, the flow regulator may conveniently, and automatically be re-opened.

Advantageously, the assembly is operable, in use, to capitalise upon the roof ridge 'pinch effect' otherwise known as the Aeolian flow band area. This effect causes wind to accelerate up the pitched roof and reach a higher wind speed (e.g. approximately triple the speed of ambient wind speed) at the apex, thus causing the rotor to turn much faster than prior art technology.

Advantageously, the wind turbine rotor support may enable a wind turbine assembly to be retro-fitted to a roof. Advantageously, the support may enable the retro-fitting without requiring the removal of roof tiles in the region where the support is secured to the structure of the roof.

The flow regulator may comprise a generally cylindrical member that generally surrounds the rotor, and has wind apertures. Alternatively, the flow regulator may comprise a generally partially cylindrical member that generally surrounds the rotor on the inlet or outlet side, and has a wind aperture.

The flow regulator may be orientable by rotation about the axis of the rotor.

The flow regulator may comprise a shutter that is orientatable across an inlet, an outlet, or an inlet and an outlet of the housing.

The flow regulator may be adapted to be orientatable in a plurality of partially open orientations.

The flow regulator may be adapted to be orientatable into any orientation between the open orientation and the closed orientation (i.e. continuously variable orientation between the two extremes).

The housing may comprise louvred inlet and outlet sides. Advantageously, such louvred sides may condition the wind flow into and out of the assembly. Further advantageously, the louvred sides may reduce the visual impact of the assembly. Yet further advantageously, the louvred sides may prevent the egress of debris from the housing in the event of structural failure of a rotor.

The louvred inlet and outlet sides may be adapted to substantially obscure the rotor from view when viewed in a plane substantially level with the rotor. Advantageously, obscuring the rotor from view in this manner obviates or reduces the risk of the rotor interfering with radar transmissions, by reducing Doppler interference with radar signals. Further, such obscuring of the rotor may further lessen the visual impact of the assembly.

The housing may be adapted to be secured to a ridge of a pitched roof

The wind turbine assembly may further comprise a generator element adapted to be driven by the rotor and to generate electrical power.

The wind turbine assembly may further comprise a wind turbine control system that is adapted to control the orientation of the flow regulator.

The wind turbine control system may be adapted to control the orientation of the flow regulator in correspondence with the speed of wind incident upon the assembly. The wind turbine assembly may further comprise a wind speed monitor element that is adapted to produce a control signal in correspondence with wind speed incident upon the wind turbine, and the wind turbine control system is adapted to control the orientation of the flow regulator in correspondence with the control signal.

The wind turbine control system may be adapted to control the orientation of the flow regulator in correspondence with a rotational speed of the rotor. The wind turbine control system may be adapted to control the orientation of the flow regulator in correspondence with an electrical power output of a generator element driven by the rotor to generate electrical power.

The assembly may comprise a plurality of rotors connected by flexible joints. The flexible joints may be universal joints. Advantageously such flexible joints may compensate for installation misalignments or relative movements during use and/or over operational lifetime.

The rotor may comprise a rotor blade tensioning mechanism. The rotor may comprise rotor blades held by two end plates, and the end plates may be biased apart. The rotors may comprise rotor blades held by blade holding disc sections that are mounted on a tensioning tube, the tensioning tube being concentric with a central drive shaft. The tensioning tube is adapted to enable one or both blade holding discs to be slid along its length to tension the rotor blades. Advantageously, such a tensioning mechanism may be used to compensate for thermal distension/contraction and wear of rotor components. Such tensioning may reduce the risk of oscillations arising within the rotor blades, and being transmitted into the roof structure.

The connection mechanism may comprise a nut and a bolt having a bolt head, the bolt passing through the first and second bracket sections, which are captured between the nut and the bolt head.

The isolation element may comprise a resilient washer.

The bracket may be provided with a further isolation element captured on the bolt adjacent the nut or the bolt head.

The first bracket section may comprise
- a spar securing portion adapted to secure to a roof structure beneath a roof covering,
- a first interconnection portion adapted to connect to the second bracket section above the roof covering, and
- a first intervening portion adapted to fit between portions of roof covering.

The first intervening portion may be substantially parallel with and offset from the spar securing section.

The second bracket section may comprise
- a second interconnection portion adapted to connect to the first bracket section, and
- a rotor support connection portion adapted to connect to the support of the wind turbine rotor,
- wherein the second interconnection portion and the rotor support connection portion meet at a vertex.

The wind turbine assembly may be secured to the roof with a vibration reduction bracket suitable for mounting an elongate generally cylindrical wind turbine rotor at the ridge of a pitched roof, comprising
- a first bracket section adapted for insertion between portions of roof covering and attachment to a roof spar,
- a second bracket section adapted for connection to a support for a wind turbine rotor,
- a connection mechanism connecting the first and second bracket sections, and
- an isolation element between the first and second bracket sections to reduce the transfer of vibrations between the bracket sections.

Preferably, the assembly is formed from a plurality of generally cylindrical rotors, which may be mounted coaxially. In this manner, preferably, the generator is of a modular construction, comprising two or more generally cylindrical rotors, connected to form a single generally cylindrical rotor.

Advantageously, in such an arrangement, differing sizes of roofs can be easily accommodated.

Preferably, the generally cylindrical rotors are operable to be rotationally offset from one another.

Advantageously, this rotational offset reduces the risk of the modular rotors undergoing constructive interference thereby reducing the risk of mechanical failure of the generator.

The generally cylindrical rotor is preferably operable, in use, to rotate in both a clockwise or anticlockwise direction. In this regard, advantageously, the generally cylindrical rotor is operable to rotate irrespective of the direction of the prevailing wind.

The generally cylindrical rotor preferably comprises one or more rotor blades. The or each rotor blade is preferably arranged and operable to cause the generally cylindrical rotor to rotate in both a clockwise or anticlockwise direction, in use.

The housing preferably comprises apertures through which wind may travel, in use. Preferably, the apertures are elongate slits, which may be louvred.

The housing may be formed from a plurality housing members, which may be mounted coaxially. In this manner, preferably, the housing is of a modular construction, comprising two or more housing members, connected to form a single housing.

The flow regulation means may comprise means to cover the apertures in the housing. The flow regulation means may comprise a barrier, which may be moveable with regard to the housing, to thereby allow more or less air into the generator.

The flow regulation means may comprise a partial housing arranged around the generally cylindrical rotor and arranged to rotate with regard to the rotor. The partial housing may comprise apertures. In an open configuration, the apertures of the partial housing may be aligned with apertures in the generator housing, thus allowing wind to flow through the device. In a closed configuration, the apertures of the partial housing may be aligned away from the apertures in the generator housing, thereby not allowing wind to flow into the generator.

Advantageously, the wind allowed into the generator can be regulated by the flow regulation means, thus allowing the device to operate at acceptable levels of rotation depending on the ambient wind conditions. Accordingly, advantageously, the generator is operable to capitalise upon roof ridge increased airflow to produce useful power output at lower ambient wind speeds than conventional wind turbine designs and also to control the wind flow into the device thus alleviate the likelihood of mechanical failure at high wind speeds by operation of flow regulation means.

The housing may be largely camouflaged against the roof. In other words, the generator may be coloured so as to blend in to the roof to which it is secured.

The wind turbine assembly may be built from recycled polymers and metals and is visually as well as physically miniaturised by virtue of being designed as an addition or incorporation of existing pitched roofs. In this way the roof pitch itself acts as an enormous funnel, collecting and focusing the incident wind into a narrow flow band at the roof ridge, where the generator, disguised as an enlarged, slat fronted ridge tile extracts the wind energy so focused. In view of the fact that the measured wind speed of a typical roof at the ridge flow band is typically three times that of the ambient wind speed, this allows for a turbine where the cross sectional area of the unit is nine times smaller than an equivalent conventional turbine.

All of the features contained herein may be combined with any of the above aspects and in any combination.

BRIEF DESCRIPTION OF THE DRAWINGS

For a better understanding of the invention, and to show how embodiments of the same may be carried into effect, reference will now be made, by way of example, to the accompanying drawings in which.

DETAILED DESCRIPTION OF EMBODIMENTS OF THE INVENTION

Figure 1:
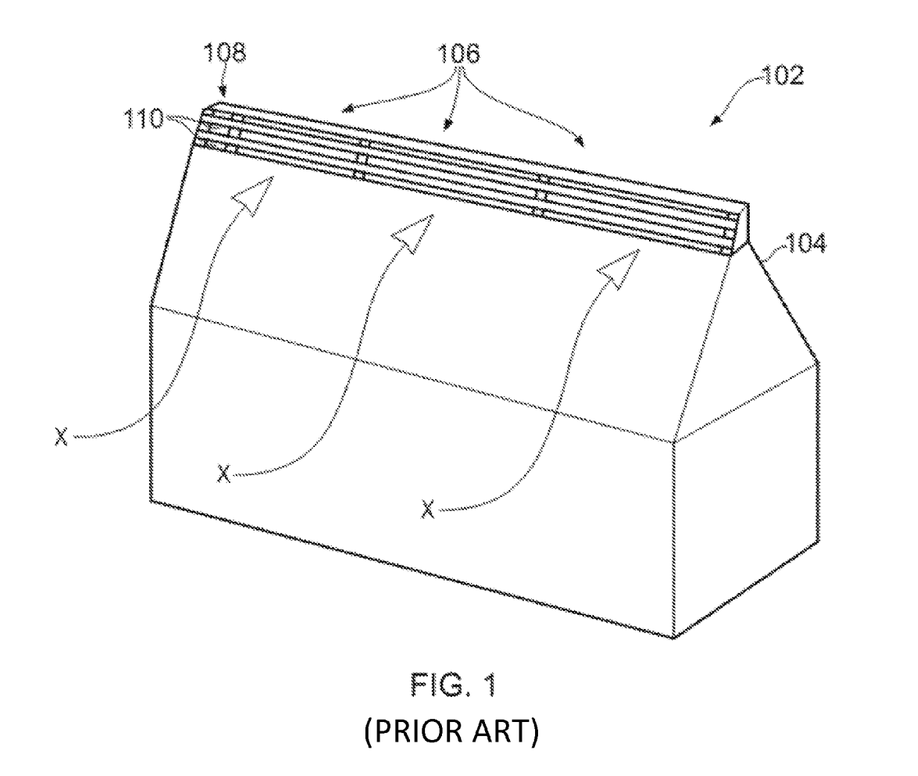
FIG. 1 shows a schematic perspective view of a wind turbine assembly secured to a pitched roof.

Referring first to FIG. 1 there is shown a schematic perspective view of a wind turbine assembly 102 secured to a pitched roof 104 comprising three modular wind turbine assembly sections 106 and an alternator section 108. As can be seen by curved arrows "X" wind is funnelled up the roof 104 toward the device 102 and through slot-like apertures 110 in the housing 112 toward the turbine assembly (described hereunder with regard to FIGS. 2 and 3).

Empirical measurement has shown that for a usual 30 degree to 45 degree pitched roof, incident wind is compressed as it clears the angled obstruction of the roof surface into a high speed flow band around the roof ridge, known as the Aeolian flow band. This band extends approximately 300 mm above the ridge top and 450 mm forward along the roof facing the incident wind. At this point, measured speeds may be of the order of three times that of the ambient wind speed.

Louvred slats in the housing pre-process and condition the incident air stream, presenting it to the active turbine blades of the rotor within the housing in a more stable and focused form. Furthermore, Helmholtz resonance inside the housing itself reduces turbulence and aerodynamic noise in the familiar way of car exhaust mufflers. Diffusion of the exiting air stream by the slatted exit, further reduces such noise.

The wind turbine assembly 102 may be formed from modular units and connected via drive couplings to a central drive shaft. In such a scenario, it is also possible and desirable to offset the relative positions of the turbine blades of the rotors of different modules along the turbine's length, e.g. alternate rotors may be relatively rotated by half the angular separation between blades on each rotor. Such an arrangement provides inbuilt beat cancellation of air passing through the blades and exiting the unit. This also helps to reduce vibration due to harmonic excitation of the unit by fluctuating aerodynamic loads. The rotors in adjacent modular units may be connected by flexible joints, to compensate for installation misalignments or relative movements during use and/or over operational lifetime.

The wind turbine assembly consists of one or more modular units, the length designed so as to be advantageous with regards to attachment at normal roof spar intervals. In one embodiment, the modular units may be approximately 1.2 meters in length.

At the centre of the wind turbine assembly 102 is a common drive shaft which is connected to subsequent module drive shaft sections by a shaft coupler. This may be offset as required. The shaft may be made of recycled metals, such as aluminium.

The drive shaft passes through a blade holding disk section at each of its ends. These disks may be made of recycled polymers, such as high density polyethylene. The disks are attached to the drive shaft and the turbine blades are designed to fit into and be fastened to these disks.

Figure 2A:
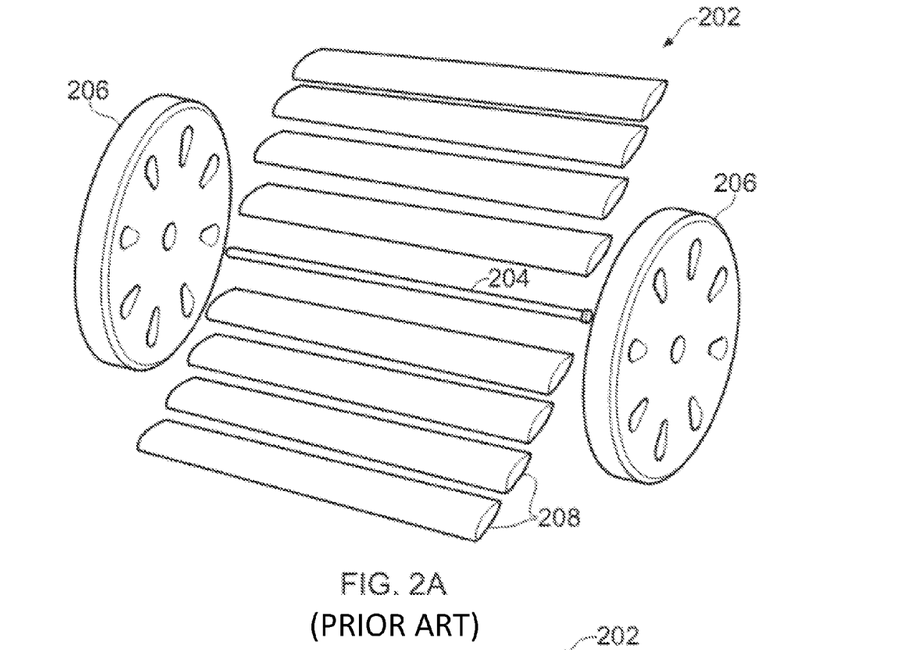
FIGS. 2A and 2B shows a rotor assembly of the wind turbine assembly.
Figure 2B:
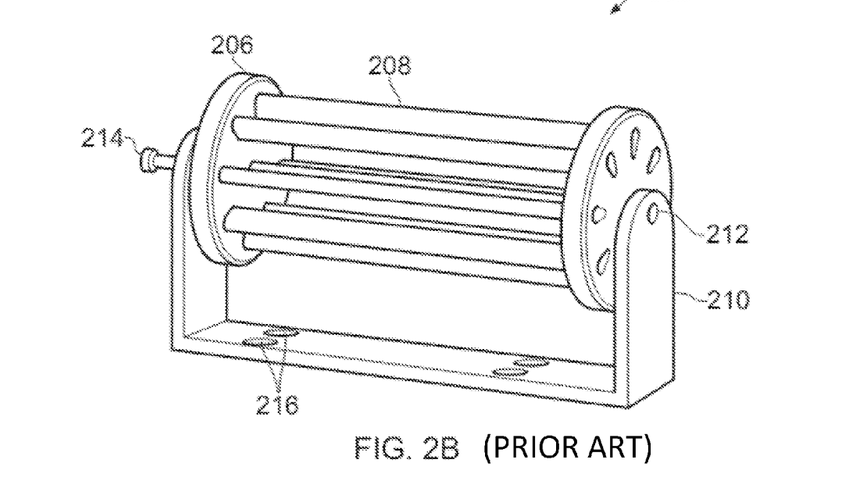

An embodiment of the rotor 202 is shown in FIGS. 2A and 2B. The rotor 202 comprises a central drive shaft 204 connected toward each end thereof to circular end plates 206 having apertures therein to house rotor blades 208. The shaft 204 is journalled in an upstanding support structure 210 with a bearing 212. The support structure 210 is adapted and operable to be secured to the ridge of a pitched roof. The shaft 204 also comprises a splined coupler 214 operable to allow it to be coupled to further shafts 204 along the length of the ridge.

The turbine blades are inexpensively manufactured, extruded blade sections, typically cut to lengths around one meter each. In this way recycled polymers, such as high density polyethylene or polyvinyl chloride may be used in their extrusion. The turbine is then attached via a bearing support structure to a pre-installed roof mounting structure.

The roof mounting support structure 210 has is adapted to be secured to mounting brackets with bolts passing through holes 216 in the base.

Surrounding the turbine rotor is a housing, which may similarly be made of extruded sections and recycled materials. Externally this may resemble an enlarged, slatted roof ridge tile of modular length, such that the turbine installation appears to be an improved ridge tile system, rather than a sizeable turbine system.

Being of low altitude (below normal radar coverage height), low cross sectional area and having a slatted front, the turbine system presents no appreciable disturbance to radar systems. The processed and diffused air stream further reduces any potential for radar disruption.

The external slats of the housing physically prevent bird and bat ingress, and as there is no need for anti collision lighting, there is no potential for insect swarming and thereby bat and bird attraction. The smoothing of the exit air stream by the housing and its slats further reduces the potential for injury to bats.

An alternator is placed at one or both ends of the wind turbine assembly, in order to convert the rotor's rotational energy into electrical power. Because the number of alternators are comparatively low, it is possible to ensure good sound insulation and vibration isolation characteristics at relatively low cost and complexity.

The turbine sections are designed to be of such maximum size and weight that each section may be lifted into position by simple manpower using access ladder system or elevating platforms (known as 'cherry pickers'). This ensures that there is minimum local disturbance caused by installation or maintenance. This negates the need for large industrial moving equipment, such as mobile cranes.

The blade cross section profile is specifically designed to work as an effective airfoil at low wind velocity and to control the airflow direction through the turbine to best effect.

The blades are held in place by a blade holding disk section 206 at the turbine ends. The blade holder disks are supported and held in place on a central drive shaft by a conical support, or similar, that also assists the flow of air through the turbine from oblique incidence angles by producing a smoother sideways exit flow and may also assist in the creation of a sideways vorticular flow action, which may assist in the unit's useful power generation from wider incident wind angles than might otherwise be possible.

Figure 3A:
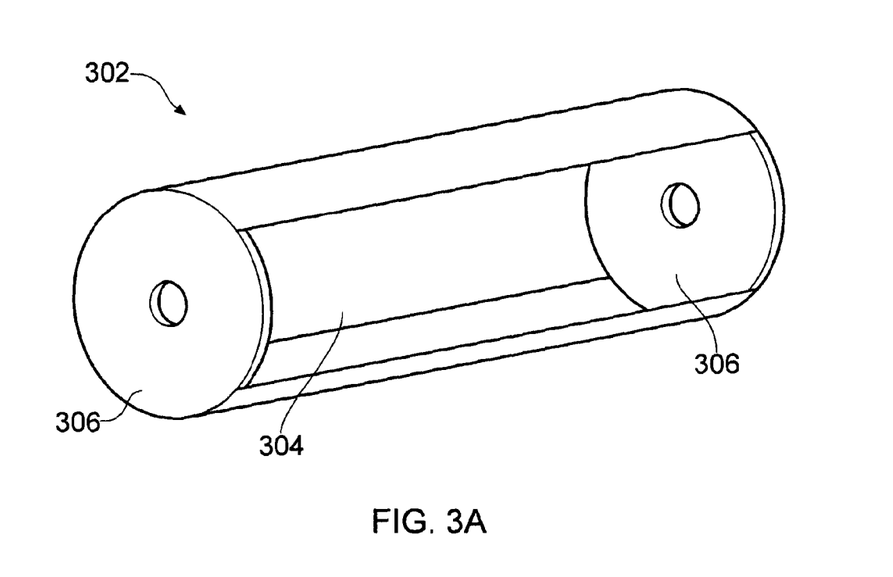
FIGS. 3A and 3B show flow regulators of the present invention.
Figure 3B:
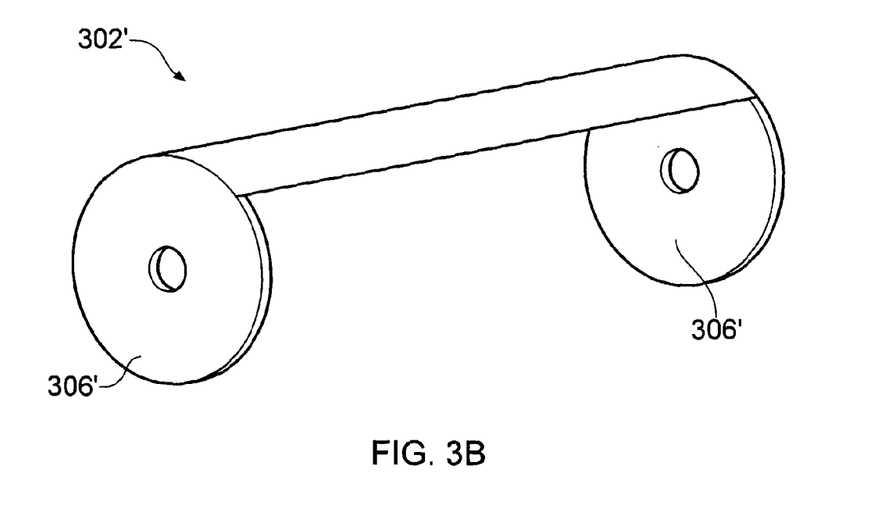

FIG. 3A shows the generally cylinder shaped flow regulator 302, within which the rotor 202 is located, coaxially. The flow regulator 302 is in the form of a cylinder having large apertures 304 and ends 306. FIG. 3B shows an alternative design of flow regulator 302' that is generally partially cylindrical, having ends 306'.

Figure 4A:
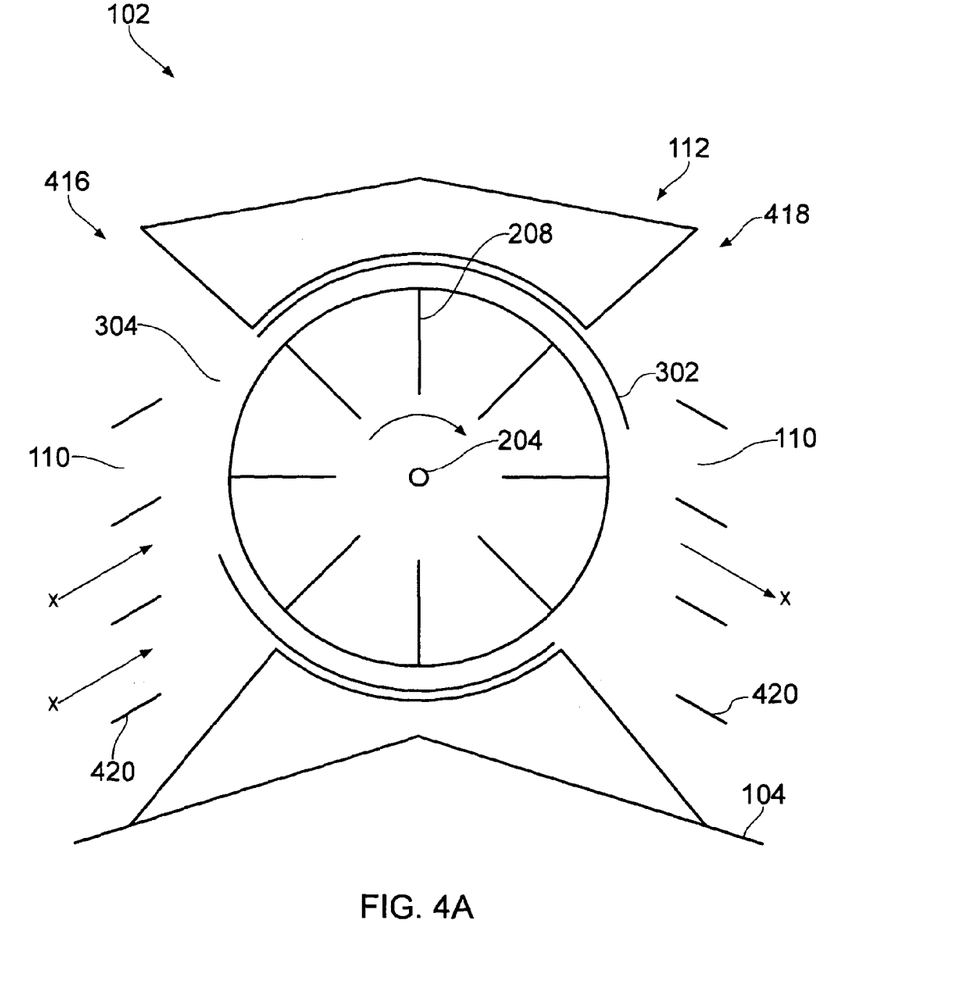
FIG. 4A shows a cross-sectional view through a wind turbine assembly in which the flow regulator is fully open.
Figure 4B:
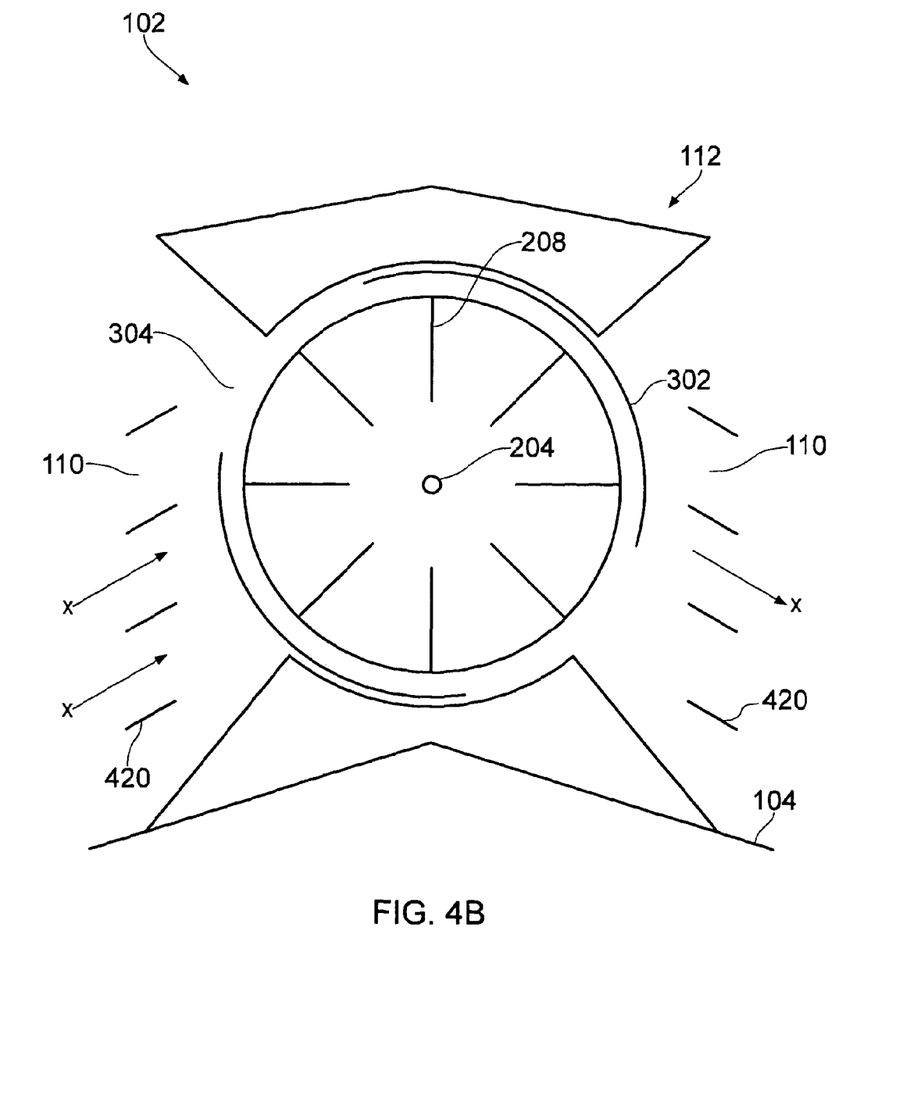
FIG. 4B shows a cross-sectional view through a wind turbine assembly in which the flow regulator is partially open.
Figure 4C:
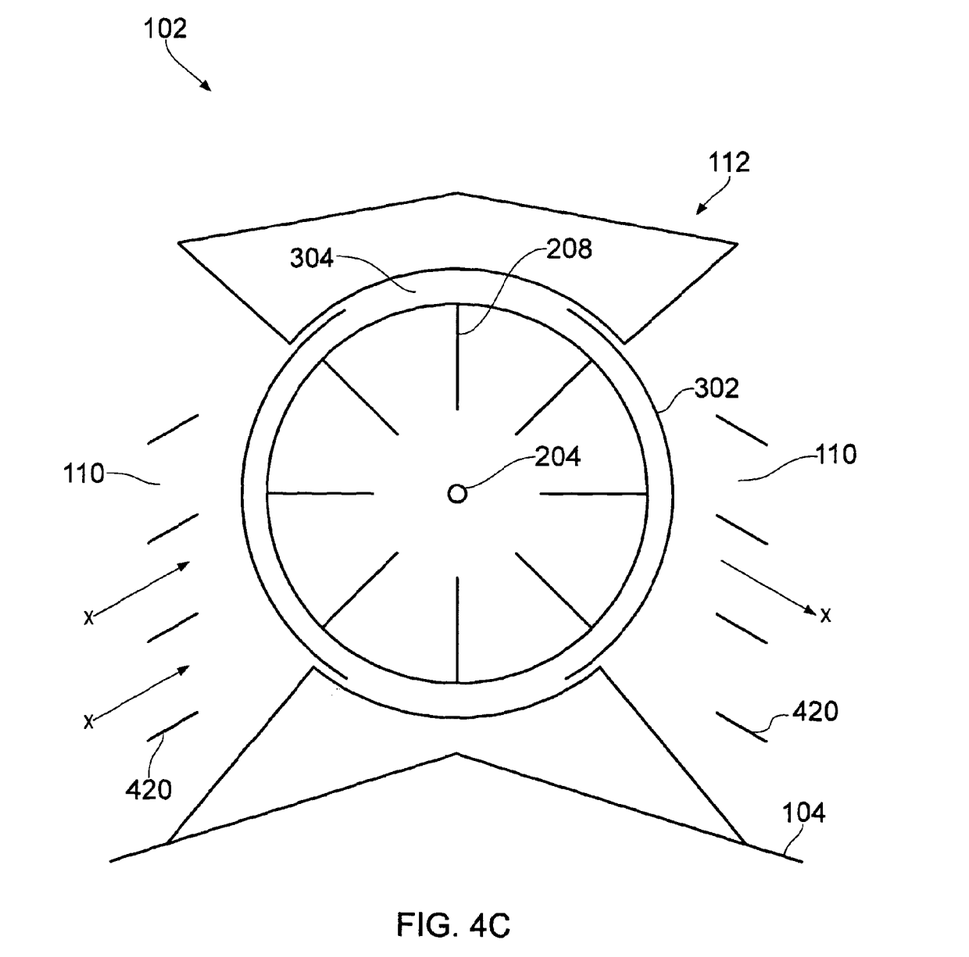
FIG. 4C shows a cross-sectional view through a wind turbine assembly in which the flow regulator is fully closed.

FIGS. 4A, 4B and 4C show cross-sectional views through the wind turbine assembly 102. Note that in this schematic view the rotor blades 208 are shown flat, but advantageously may be sectioned, for example as shown in FIG. 2.

In a fully open position the flow regulator 302 is orientated such that the regulator apertures 304 are aligned with the wind inlet 416 and wind outlet 418, as shown in FIG. 4A. Slats 420 are provided in the wind inlet 416 and the wind outlet 418 to define slot-like apertures 110.

In response to an excess wind speed, rotor speed, or generated electrical power, the control system (not shown) may seek to limit the wind flow to the rotor. Accordingly, the flow regulator 302 may be rotated so as to reduce the airflow and the incident airflow cross sectional area, as shown in FIG. 4B. In this orientation, the regulator apertures 304 of the flow regulator 302 are only partially aligned with the inlet and outlets 416 and 418.

In the case of high winds, or during periods of maintenance, the flow regulator may be orientated in a fully closed position in which the regulator apertures 304 are out of alignment with the inlet and outlets 416 and 418, as shown in FIG. 4C.

The flow regulator 302' of FIG. 3B may be used in a similar manner to flow regulator 302 of FIG. 3A, except that it only fully or partially closes one of the inlet or outlet when rotated to reduce the airflow through the rotor.

As described, the flow regulator 302 may shut off the airflow to the rotor completely or almost completely at very high wind speeds to protect the turbine from over speed. It may also reduce the airflow during normal operation in order to achieve a near constant power output from the generator. Ideally, such a regulation would limit the rotation of the rotor once the power output of the assembly is at or near the maximum rated power output of the unit. The flow regulation device 302 may allow full coupling to the airflow at low wind speed and reduced flow at moderate wind speeds in order to regulate the unit towards an ideal power output. These may be wind speeds where conventional devices are not yet close to their rated outputs.

Wind speed incident onto the assembly 102 may be measured by a conventional anemometer type sensor that is either internal or external to the turbine housing. Wind speed may also be determined from the rotational speed of the rotor or the output power generated by the assembly.

The housing physically protects the rotor and flow regulator whilst allowing the wind flow to pass through the rotor via slatted entry and exit areas, when the flow regulator is in an open or partially open position. The louvred slats 420 may be shaped and angled so that the airflow is focused and directed towards the turbine so as to increase the effective efficiency. Acting as 'forward flaps' or 'strakes' as found on some aircraft wings, for part of the blade movement cycle may raise efficiency by producing short periods of higher than usual blade lift force, which may be arranged to help overcome alternator and generator peak force requirements or as it is generally known in the case of permanent magnet alternators, 'the cogging effect', This may allow the turbine to overcome the 'cogging' effect force at lower than otherwise wind speeds and extend the useful wind speed range of the unit. The slatted housing is further designed so as to sit within the roof top flow band and to enable it to capture that flow band more effectively.

The slats 420 may also be so configured as to increase airflow at the turbine upon flow entry and to expand the airflow upon flow exit, thus increasing the pressure differential across the turbine and therefore its airflow velocity.

Correct configuration and design of the blade sections in association with the slats, may produce a bi-direction turbine design and this arrangement is preferred for most instances of the design.

The external slats 420 may also be hinged so as to provide a secondary airflow reduction and protection capability. In such a configuration, this configuration may reduce the airflow drag in severe wind conditions, thus reducing the horizontal stress component of the roof.

Each section may be of predetermined length and assembled as a modular structure utilising a common central drive shaft, ultimately connecting to an alternator at either or both ends. The central drive shaft may be constructed by the inter-connection of each module employed via a shaft coupling, so as to produce one or more continuous central drive shafts.

Figure 5A:
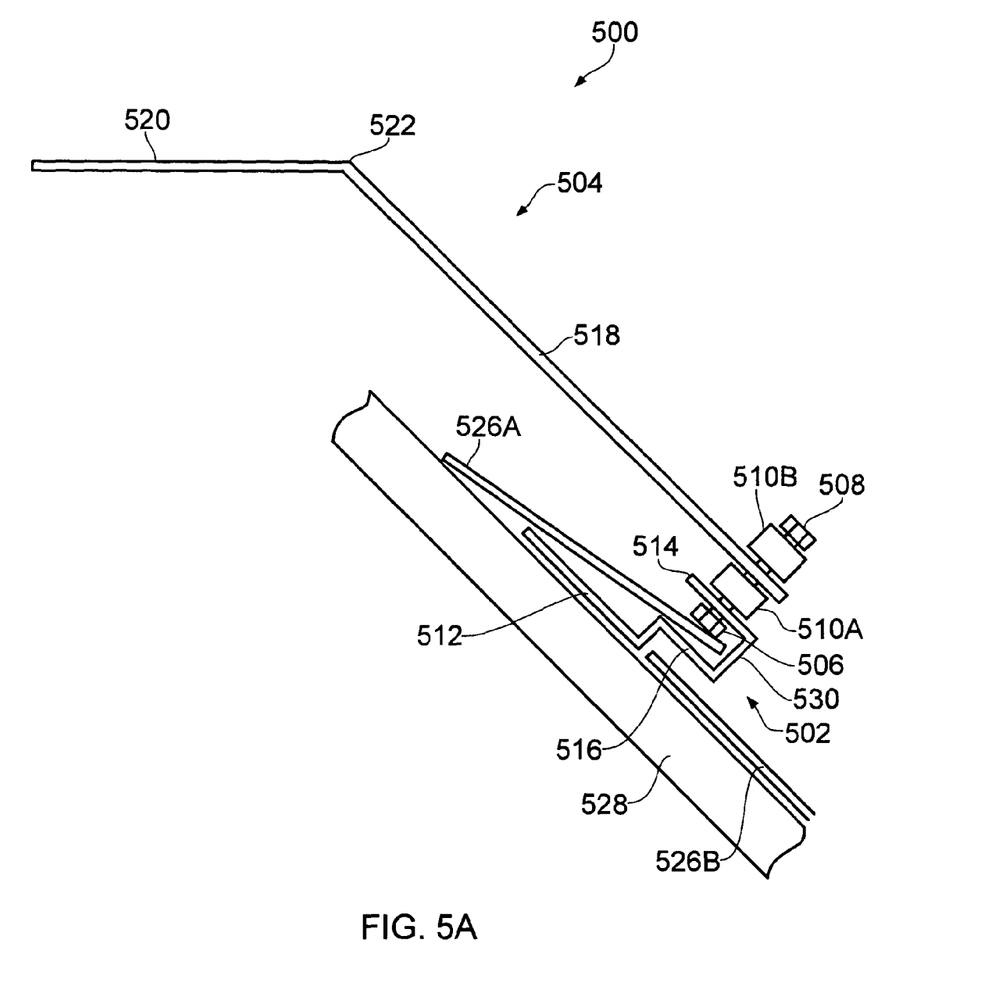
FIGS. 5A and 5B show side and perspective views of a wind turbine mounting bracket.
Figure 5B:
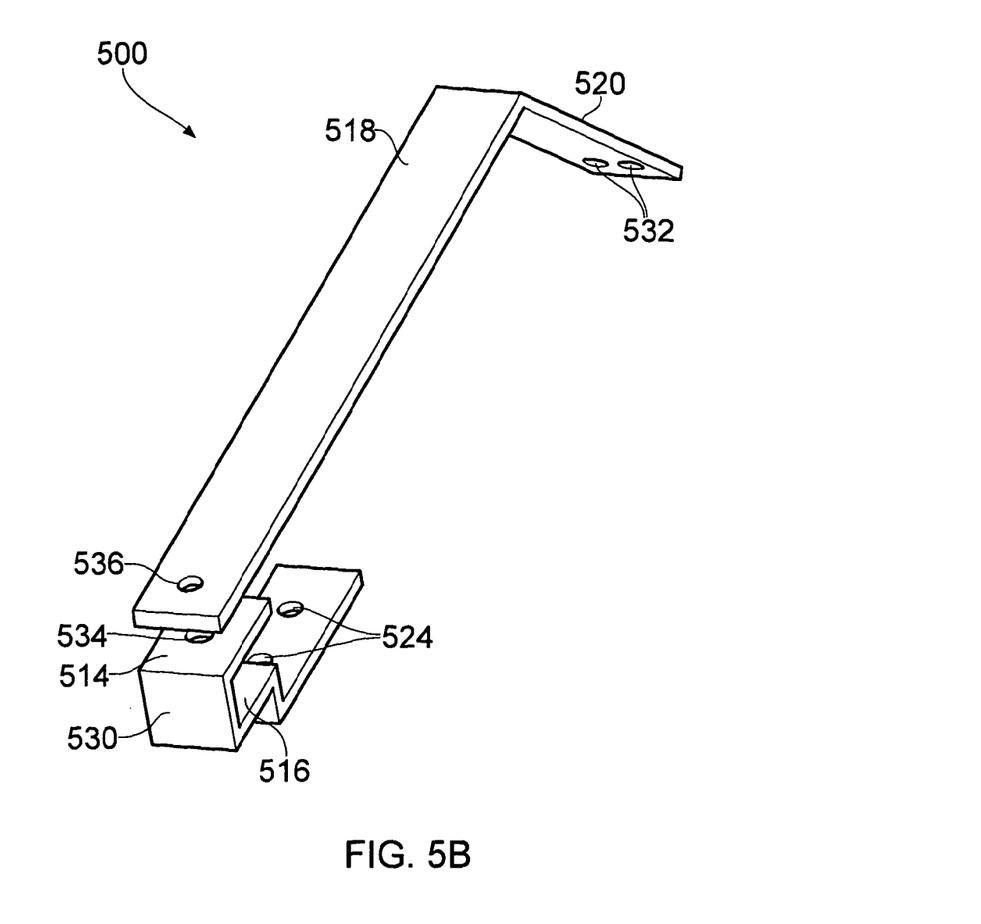

FIGS. 5A and 5B show two different views of a composite vibration reduction bracket 500 suitable for mounting a wind turbine assembly of FIGS. 1 to 4 to the ridge of a pitched roof.

The bracket 500 comprises a first bracket section 502, a second bracket section 504, a bolt 506, nut 508, and first and second elasticated washers 510A and 510B. The first bracket section 502 comprises a spar securing portion 512, a first interconnection portion 514, and a first intervening portion 516. The second bracket section 504 comprises a second interconnection portion 518, and a rotor support connection portion 520, which meet at a vertex 522. For clarity, the nut, bolt, and elasticated washers are omitted from FIG. 5B.

The first bracket section 502 is adapted to be insertion between roof tiles to a roof spar, to which it is attached by spar attachment screws or bolts (not shown) through spar attachment holes 524. When the bracket 500 is secured to a roof, the spar securing portion 512 and first intervening portion 516 are slid between tiles 526A and 526B, such that the spar securing portion 512 is adjacent a roof spar 528, and the first intervening portion 516 remains at least partially between the tiles. The spar securing portion 512 and first intervening portion 516 are substantially parallel and offset by approximately the thickness of a tile 526B. The angled section 530 extends from the first intervening portion 516 such that the first interconnection portion 514 is spaced above the tiles 526A.

The spar attachment screws pass through clearance holes previously drilled into the covering tile(s) 526A (not shown). The position of the clearance holes is determined by measurement with respect to the bolt 506. Alternatively a drilling template may be used that locates in the spar attachment holes.

The rotor support connection portion 520 of the second bracket section 504 is adapted for connection to a support 210 for a wind turbine rotor, by bolts passing through support attachment holes 532. The vertex between the second interconnection portion 518, and the rotor support connection portion 520 corresponds with the apex at the ridge of a gabled roof. The second bracket section 504 remains spaced above the tiles 526A and 526B.

The bolt 506 threads through interconnection holes 534 and 536 in the first interconnection portion 514 and the second interconnection portion 518. The elasticated washer 510A and reduces the transfer of vibrations between the first and section bracket sections 502 and 504. Advantageously the provision of such a washer reduces or isolates the roof spars from mechanical vibrations of the rotor.

Further elasticated washers may be provided captured on the thread of the bolt 506 between the either or both of the bolt head 538 and nut 508 and the adjacent bracket section 502 or 504, e.g. washer 510B. Advantageously, the provision of such further washers further reduces the transfer of vibrations between the first and section bracket sections 502 and 504, and so the rotor and roof structure.

The elasticated washer may be of any suitable resilient material, for example a natural or synthetic rubber.

Although the bracket 500 has been described secured to a tiled roof, the invention is also applicable to roofs that are slated or have other roof coverings, such as thatch.

The figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A wind turbine assembly comprising,
   an elongate generally cylindrical rotor operable to rotate about an axis,
   an elongate rotor housing that houses the rotor and which is adapted to be secured to a roof, and
   a flow regulator within the housing that is adapted to regulate wind flow to the rotor,
   wherein the housing has a wind inlet and a wind outlet,
   the flow regulator is orientatable in an open orientation, a closed orientation and a partially open orientation, and
   wherein the flow regulator comprises a generally cylindrical member that generally surrounds the rotor, and has wind apertures that are aligned with, out of alignment with, and partially aligned with the inlet and outlet of the housing in the open orientation, closed orientation and partially open orientation respectively, or a generally partially cylindrical member that generally surrounds the rotor, and has a wind aperture that is aligned with, out of alignment with, and partially aligned with the inlet or outlet of the housing in the open orientation, closed orientation and partially open orientation respectively.

2. An assembly according to claim 1, wherein the flow regulator comprises a generally cylindrical member that generally surrounds the rotor, and has wind apertures.

3. An assembly according to claim 1, wherein the flow regulator comprises a generally partially cylindrical member that generally surrounds the rotor, and has a wind aperture.

4. An assembly according to claim 1, wherein the flow regulator is orientable by rotation about the axis of the rotor.

5. An assembly according to claim 1, wherein the flow regulator is adapted to be orientatable in a plurality of partially open orientations.

6. An assembly according to claim 1, wherein the flow regulator is adapted to be orientatable into any orientation between the open orientation and the closed orientation.

7. An assembly according to claim 1, wherein the housing comprises louvred inlet and outlet sides.

8. An assembly according to claim 7, wherein the louvred inlet and outlet sides are adapted to substantially obscure the rotor from view when viewed in a plane substantially level with the rotor.

9. An assembly according to claim 1, wherein the housing is adapted to be secured to a ridge of a pitched roof.

10. An assembly according to claim 1, further comprising a generator element adapted to be driven by the rotor and to generate electrical power.

11. An assembly according to claim 1, further comprising a wind turbine control system that is adapted to control the orientation of the flow regulator.

12. An assembly according to claim 11, wherein the wind turbine control system is adapted to control the orientation of the flow regulator in correspondence with the speed of wind incident upon the assembly.

13. An assembly according to claim 12, wherein the wind turbine further comprises a wind speed monitor element that is adapted to produce a control signal in correspondence with wind speed incident upon the wind turbine, and the wind turbine control system is adapted to control the orientation of the flow regulator in correspondence with the control signal.

14. An assembly according to claim 11, wherein the wind turbine control system is adapted to control the orientation of the flow regulator in correspondence with a rotational speed of the rotor.

15. An assembly according to claim 11, wherein the wind turbine control system is adapted to control the orientation of the flow regulator in correspondence with an electrical power output of a generator element driven by the rotor to generate electrical power.

16. An assembly according to claim 1, wherein the assembly comprises a plurality of rotors connected by flexible joints.

17. An assembly according to claim 1, wherein the rotor comprises rotor blades held by two end plates and the end plates are biased apart.

18. A building comprising a wind turbine assembly according to claim 1, wherein the wind turbine assembly is secured to a roof of the building.

19. A wind turbine assembly comprising,
   an elongate generally cylindrical rotor operable to rotate about an axis,
   an elongate rotor housing that houses the rotor and which is adapted to be secured to a roof, and
   a flow regulator within the housing that is adapted to regulate wind flow to the rotor,
   wherein the housing has a wind inlet and a wind outlet,
   the flow regulator is orientatable in an open orientation, a closed orientation and a partially open orientation, and
   wherein the flow regulator comprises a generally cylindrical member that generally surrounds the rotor, and has wind apertures that are aligned with, out of alignment with, and partially aligned with the inlet and outlet of the housing in the open orientation, closed orientation and partially open orientation respectively.

20. A wind turbine assembly comprising,
   an elongate generally cylindrical rotor operable to rotate about an axis, an elongate rotor housing that houses the rotor and which is adapted to be secured to a roof, and a flow regulator within the housing that is adapted to regulate wind flow to the rotor, wherein the housing has a wind inlet and a wind outlet, the flow regulator is orientatable in an open orientation, a closed orientation and a partially open orientation, and wherein the flow regulator comprises a generally partially cylindrical member that generally surrounds the rotor, and has a wind aperture that is aligned with, out of alignment with, and partially aligned with the inlet or outlet of the housing in the open orientation, closed orientation and partially open orientation respectively.

\* \* \* \* \*